United States Patent
Oh et al.

(10) Patent No.: US 8,116,957 B2
(45) Date of Patent: Feb. 14, 2012

(54) SYSTEM AND METHOD FOR CONTROLLING CLUTCH ENGAGEMENT IN HYBRID VEHICLE

(75) Inventors: Jong Han Oh, Gyeonggi-do (KR); Sang Hee Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 907 days.

(21) Appl. No.: 12/214,596

(22) Filed: Jun. 21, 2008

(65) Prior Publication Data

US 2009/0156355 A1 Jun. 18, 2009

(30) Foreign Application Priority Data

Dec. 13, 2007 (KR) .................. 10-2007-0130046

(51) Int. Cl.
G06F 7/00 (2006.01)
G06F 17/00 (2006.01)

(52) U.S. Cl. ....................................................... 701/67

(58) Field of Classification Search .................. 701/51, 701/54, 58, 60, 67, 68, 70, 79, 83–84; 477/5–6, 477/8, 43, 57, 58, 70, 166; 903/946; 192/3.51, 192/3.54, 3.55, 3.57, 3.58
See application file for complete search history.

(56) References Cited

U.S. PATENT DOCUMENTS

| | | | |
|---|---|---|---|
| 4,520,680 A * | 6/1985 | Tatsumi | 73/862.191 |
| 6,336,889 B1 * | 1/2002 | Oba et al. | 477/5 |
| 6,974,009 B2 * | 12/2005 | Hoshiya et al. | 192/3.63 |
| 7,389,168 B2 * | 6/2008 | Imazu et al. | 701/54 |
| 7,650,956 B2 * | 1/2010 | Hirata et al. | 180/248 |
| 7,749,132 B2 * | 7/2010 | Motosugi et al. | 477/5 |
| 7,758,467 B2 * | 7/2010 | Ashizawa et al. | 477/5 |
| 7,766,107 B2 * | 8/2010 | Joe et al. | 180/65.21 |
| 7,815,545 B2 * | 10/2010 | Nakashima et al. | 477/138 |
| 2007/0056784 A1 * | 3/2007 | Joe et al. | 180/65.2 |
| 2007/0080005 A1 * | 4/2007 | Joe | 180/65.2 |
| 2007/0102208 A1 * | 5/2007 | Okuda et al. | 180/65.3 |
| 2007/0227791 A1 * | 10/2007 | Ueno | 180/65.2 |
| 2007/0275823 A1 * | 11/2007 | Motosugi et al. | 477/176 |

FOREIGN PATENT DOCUMENTS

| | | |
|---|---|---|
| JP | 2000-071815 A | 3/2000 |
| JP | 2000-136835 | 5/2000 |
| JP | 2004-270785 | 9/2004 |
| JP | 2005-138743 | 6/2005 |
| JP | 2005-147312 | 6/2005 |
| JP | 2006-010044 | 1/2006 |
| JP | 2007-083796 | 4/2007 |
| JP | 2007-112258 | 5/2007 |

* cited by examiner

*Primary Examiner* — Khoi Tran
*Assistant Examiner* — Harry Oh
(74) *Attorney, Agent, or Firm* — Edwards Wildman Palmer LLP; Peter F. Corless

(57) ABSTRACT

The present invention provides a system and method for controlling clutch engagement in a hybrid vehicle, in which an appropriate clutch engagement mode is selected based on vehicle state, and the like, and a speed difference between both sections of a clutch and a torque transmitted to the vehicle during the clutch engagement process are controlled by reflecting a parameter changed by the clutch engagement mode, thus improving acceleration performance and driving performance, reducing engagement impact, and simply providing various clutch engagement modes.

7 Claims, 16 Drawing Sheets

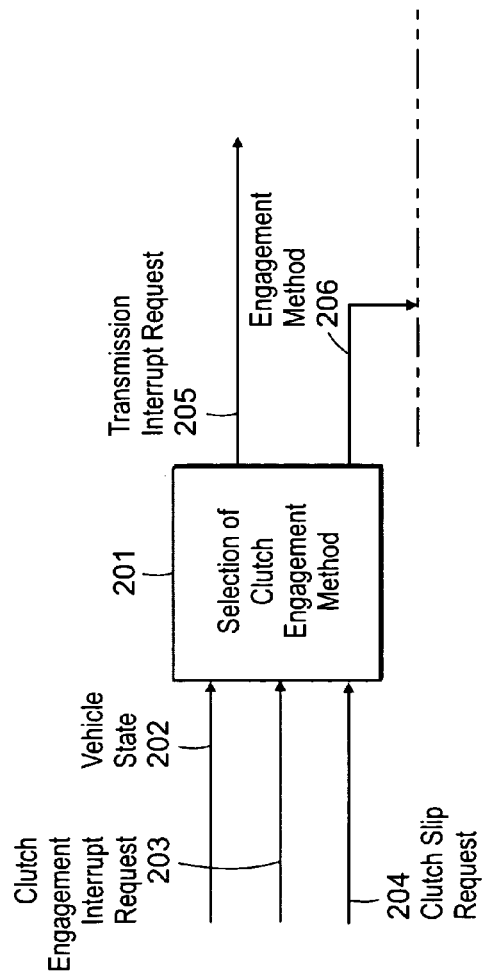

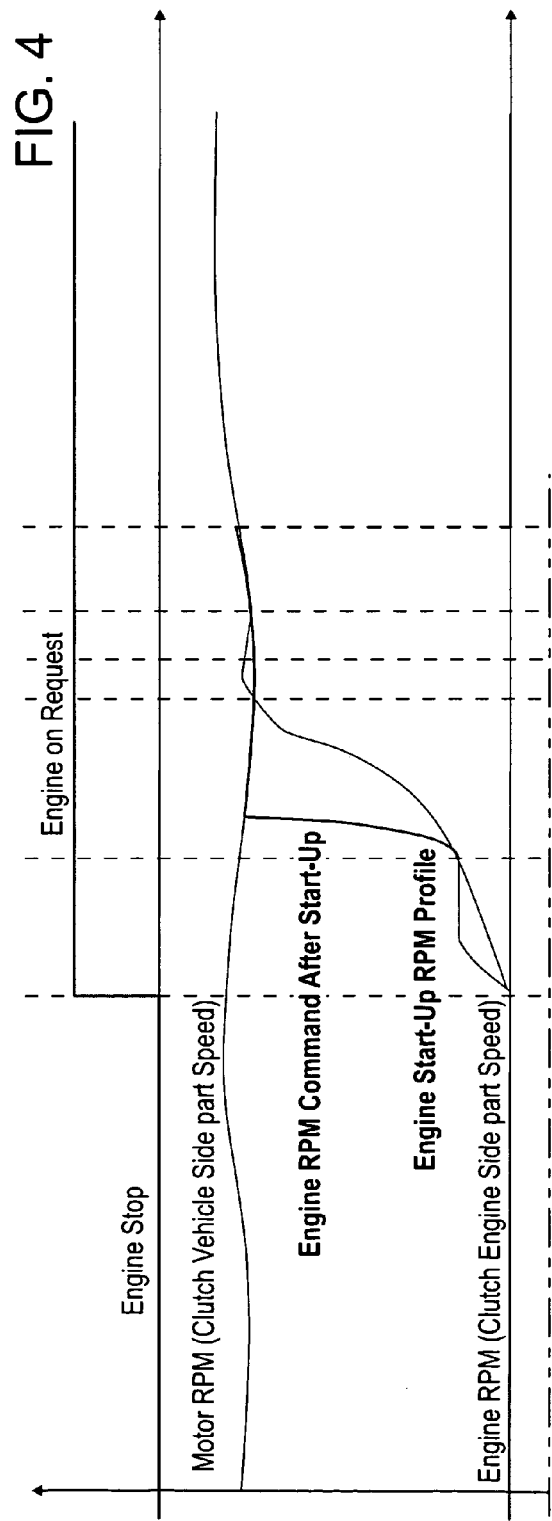

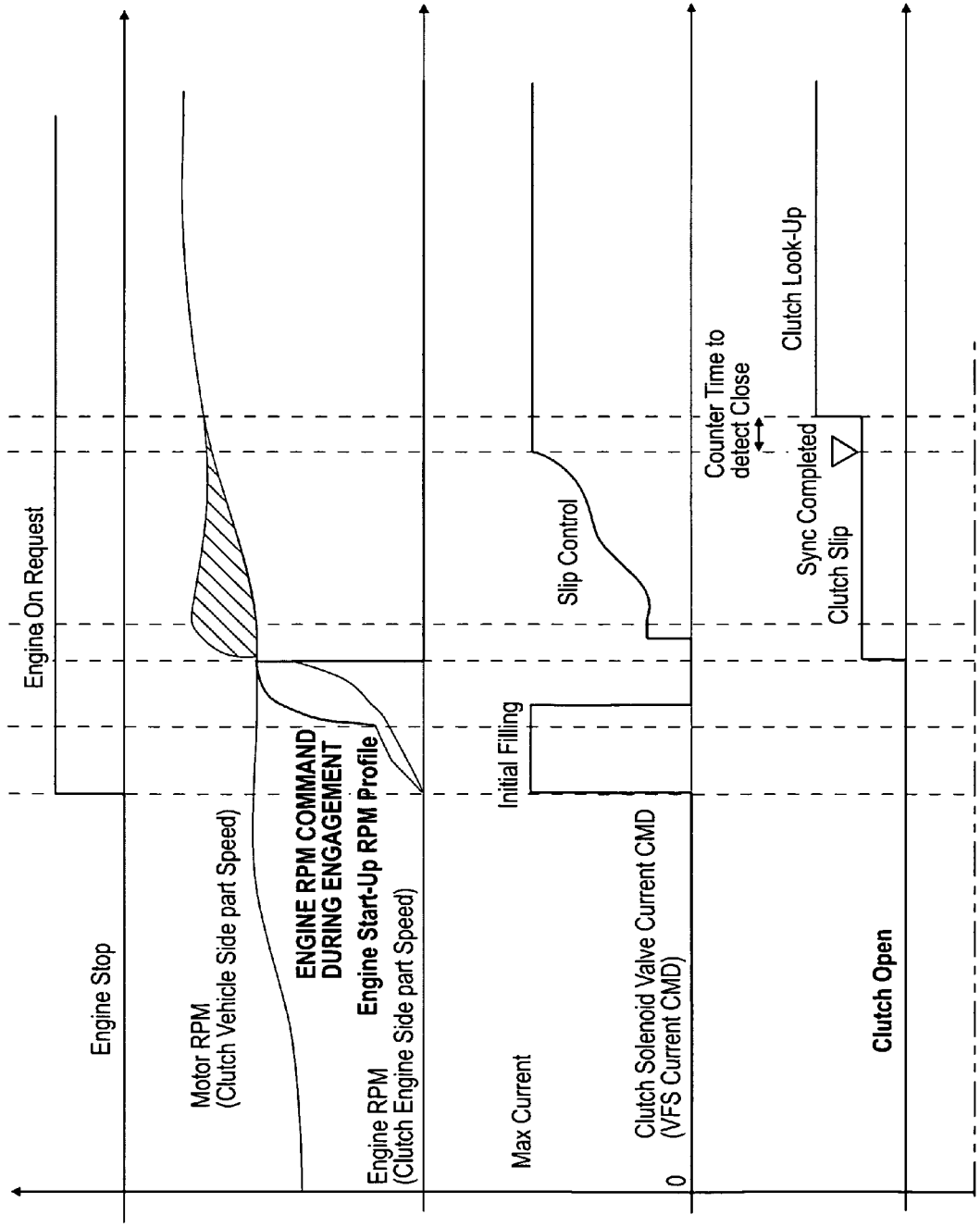

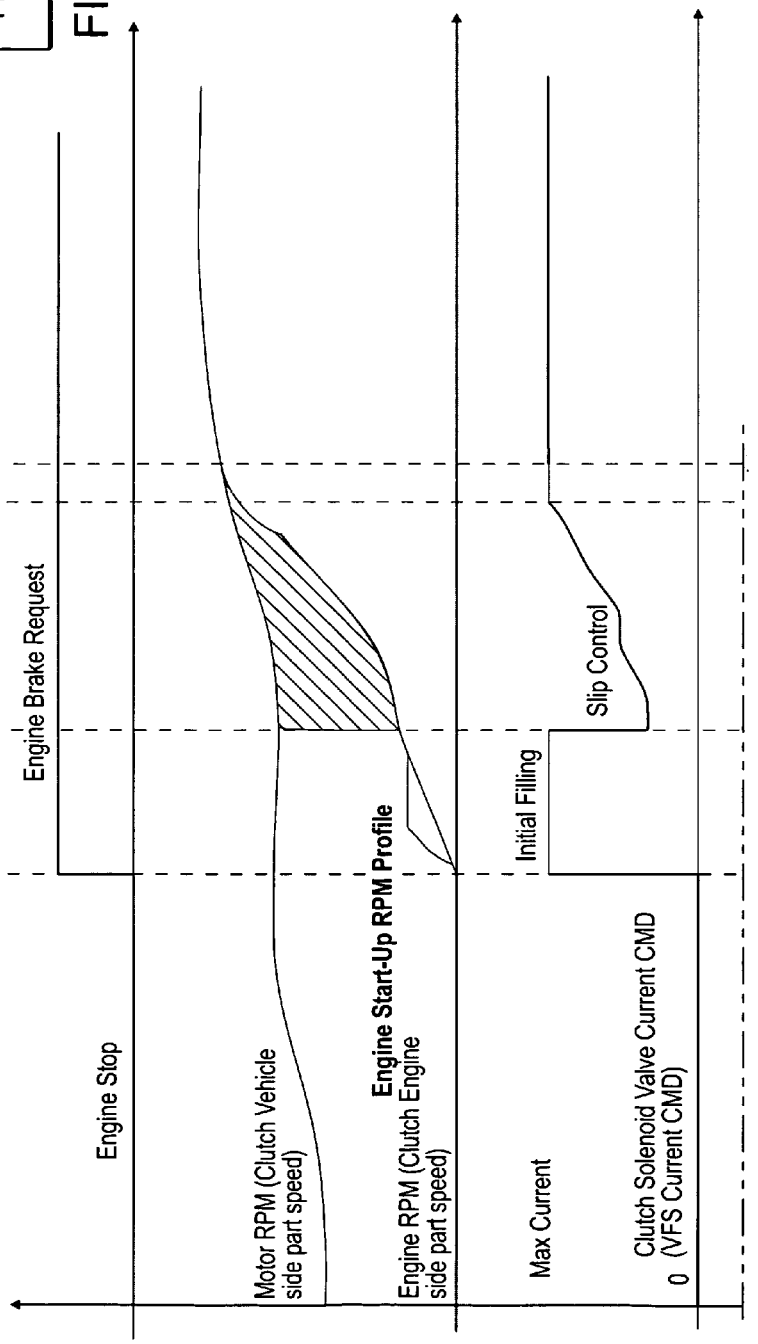

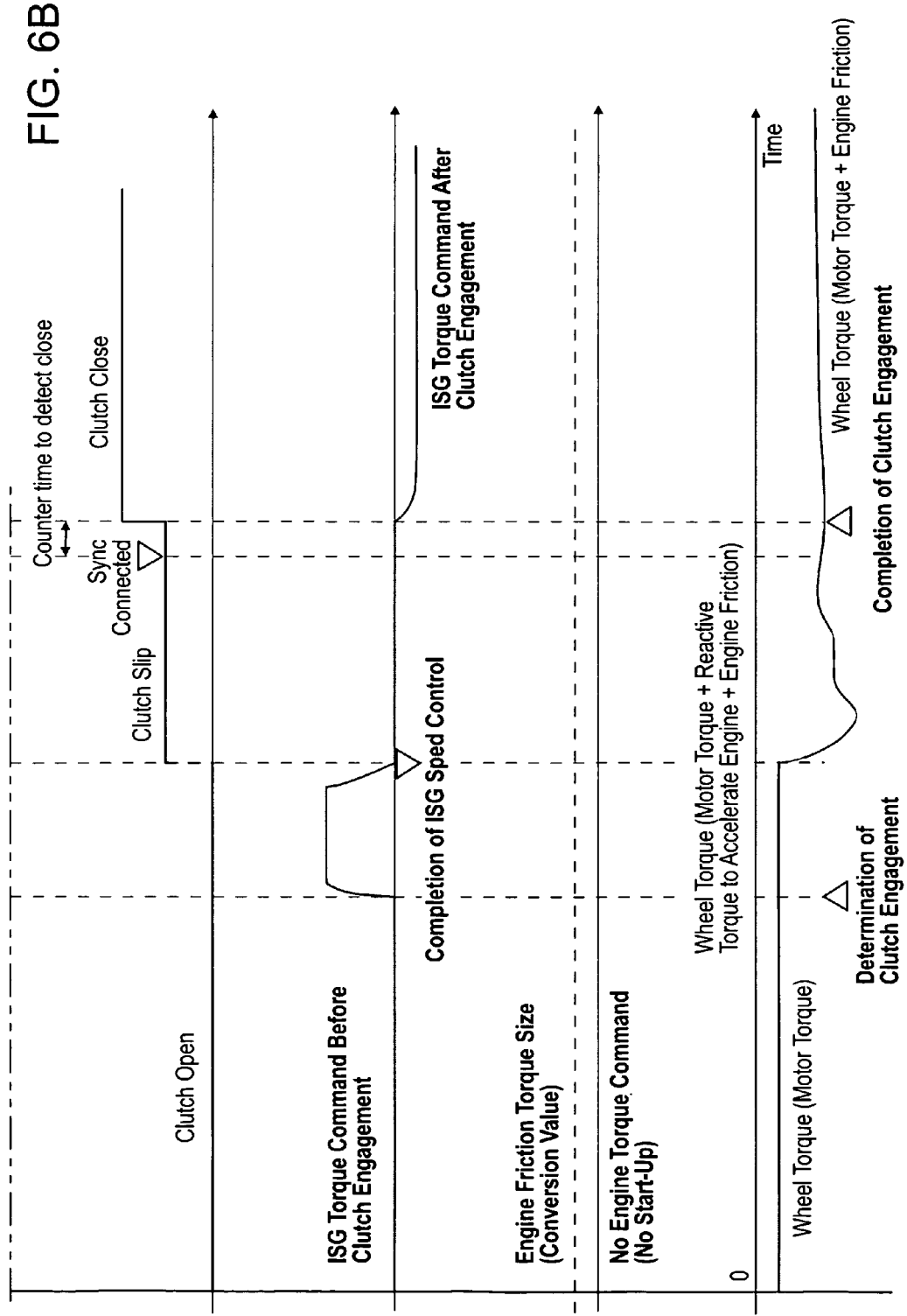

SYSTEM AND METHOD FOR CONTROLLING CLUTCH ENGAGEMENT IN HYBRID VEHICLE

CROSS-REFERENCE TO RELATED APPLICATION

This application claims under 35 U.S.C. §119(a) the benefit of Korean Patent Application No. 10-2007-0130046 filed Dec. 13, 2007, the entire contents of which are incorporated herein by reference.

BACKGROUND (a) Technical Field

The present invention relates to a system and method for controlling clutch engagement in a hybrid vehicle, which can improve acceleration performance and driving performance, reducing engagement impact, and providing various clutch engagement modes in a simple and convenient manner.

(b) Background Art

A hybrid vehicle, in the broad sense, means a vehicle driven by at least two different types of power source combined. However, generally, it refers to a vehicle powered by an engine that runs on fuel and a motor that runs on an electric battery. Such a hybrid vehicle is referred to as a hybrid electric vehicle.

To meet the demands of today's society for the improvement of fuel efficiency and the development of a more environmentally friendly product, research and development is being actively conducted on hybrid electric vehicles.

As known in the art, hybrid electric vehicles have various power transfer structures. Most hybrid electric vehicles that have been researched up to present adopt a parallel type structure or a serial type.

Here, the serial type in which the engine and the motor are arranged in series has the advantages of a simpler structure and simpler control logic than the parallel type. However, since it stores mechanical energy from the engine in a battery used to power the motor and drive the vehicle, it has the disadvantage of poor efficiency in converting energy.

In contrast, the parallel type has the disadvantages of a more complicated structure and more complicated control logic than the serial type. However, since it can use the engine's mechanical energy and the battery's electrical energy simultaneously, it has the advantage of efficiency in using energy.

Meanwhile, as shown in FIG. 1, a typical hybrid vehicle includes an integrated starter and generator (ISG) 101, an engine 103, a clutch 105, a motor 107, and a transmission 109, in which the positions of the IGS 101 and the engine 103 may be shifted.

The ISG 101 is directed to a motor capable of motoring and generating. It is connected to the engine 103 by mechanical means such as a belt, a chain, a gear, etc., and its connection ratio is determined variously as occasion demands. The motor 107 is directed to a motor capable of motoring and generating. The transmission 109 is a device capable of varying the gear ratio between the input and output through an automatic control and composed of one or more planet gear set or differential gear set.

Meanwhile, in a hybrid electric vehicle having the main clutch 105 controlled automatically or a vehicle equipped with an automated manual transmission (AMT), the driving performance and durability of the vehicle depends on the engagement mode of the main clutch which acts to interrupt or transmit the engine power.

However, conventionally, an appropriate clutch engagement mode is not selected based on various factors, and a change in torque caused in the clutch engagement is not actively controlled, and thus the durability, driving performance, acceleration performance and fuel efficiency of the vehicle are deteriorated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a system for controlling clutch engagement in a hybrid vehicle including a clutch disposed between an engine and a motor, the system comprising a determination unit for selecting an engagement mode from a plurality of clutch engagement modes based on vehicle state, a clutch engagement interrupt request by a user, and a clutch slip request by the user.

In a preferred embodiment, the plurality of clutch engagement modes are classified according to an engine start-up profile, an ignition RPM, an engine RPM command after ignition, and a difference in a friction start RPM.

In another preferred embodiment, the plurality of clutch engagement modes comprise: a first clutch engagement mode, in which speed of engine side clutch section and that of transmission side clutch section are synchronized, in a state where the sections of the clutch are separated from each other, and then an oil pressure is increased; a second clutch engagement mode, in which the two speeds are synchronized, in a state where the sections of the clutch are slipping with each other, and then the oil pressure is increased; and a third clutch engagement mode, in which the sections of the clutch are engaged with each other, in a state where the speed of the motor side clutch section is higher than that of the engine side clutch section, to apply a braking force to the vehicle.

In still another preferred embodiment, the system further comprises: a first control unit for calculating an engine torque command and a VFS current command for adjusting a speed difference between the sections of the clutch; and a second control unit for calculating a motor torque command for adjusting a torque transmitted to the vehicle during clutch engagement.

In yet another preferred embodiment, the first control unit comprises: a slip amount calculation unit; and an engine torque command calculation unit for calculating an engine torque command based on a slip amount calculated by the slip amount calculation unit, wherein an engine torque table according to the slip amount is varied by the clutch engagement mode.

In still yet another preferred embodiment, the second control unit comprises: a clutch model unit for calculating a present clutch transmission torque by receiving a slip amount, a clutch design specification, a present clutch pressure, and a clutch friction coefficient according to an oil temperature; and a motor torque command calculation unit for calculating a motor torque command by a difference obtained by comparing the present clutch transmission torque calculated by the clutch model unit and a driver demand torque.

In another aspect, the present invention provides a method for controlling clutch engagement in a hybrid vehicle including a clutch disposed between an engine and a motor, the method comprising selecting an engagement mode from a plurality of clutch engagement modes based on vehicle state, a clutch engagement interrupt request, and a clutch slip request.

In a further preferred embodiment, the plurality of clutch engagement modes are classified according to an engine start-up profile, an ignition RPM, an engine RPM command after ignition, and a difference in a friction start RPM.

In another further preferred embodiment, the method further comprises: calculating an engine torque command for adjusting a speed difference between the sections of the clutch by reflecting a parameter change according to the clutch engagement mode; and calculating a motor torque command for adjusting a torque transmitted to the vehicle during clutch engagement.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above and other features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein:

FIG. 6 is a diagram showing a change in respective commands in a third clutch engagement mode;

Figure 1:
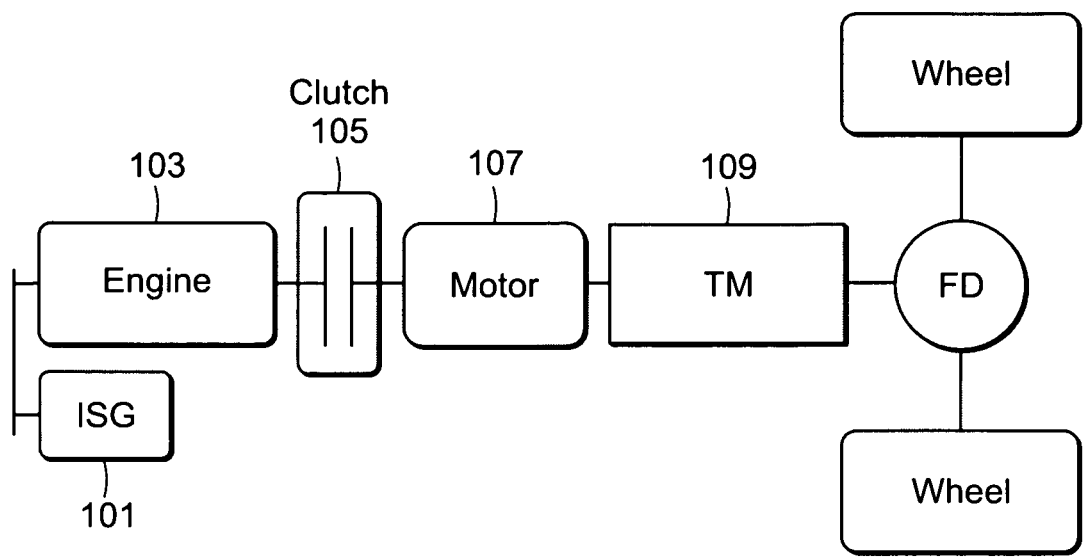
FIG. 1 is a diagram showing a configuration of a general hybrid electric vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 2:
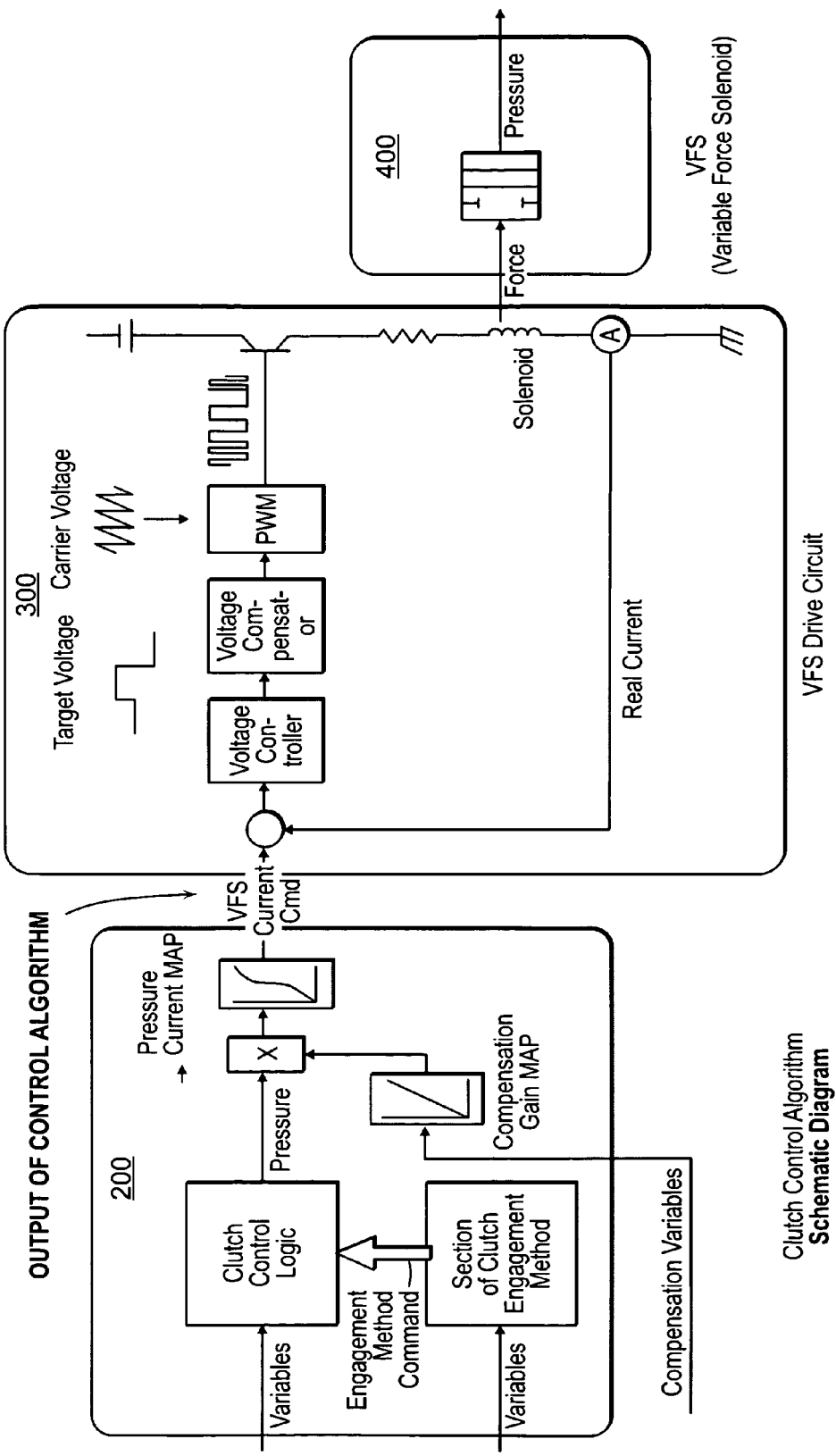
FIG. 2 is a diagram showing a configuration in which a clutch engagement control system in accordance with a preferred embodiment of the present invention is employed.

As shown in FIG. 2, a clutch engagement control system 200 in accordance with the present invention performs clutch engagement mode selection and torque control. The control system 200 transmits a variable force solenoid (VFS) current command to a VFS driving circuit 300. According to the current command, the driving circuit 300 drives a VFS 400 to change the oil pressure acting on a clutch.

Figure 3B:
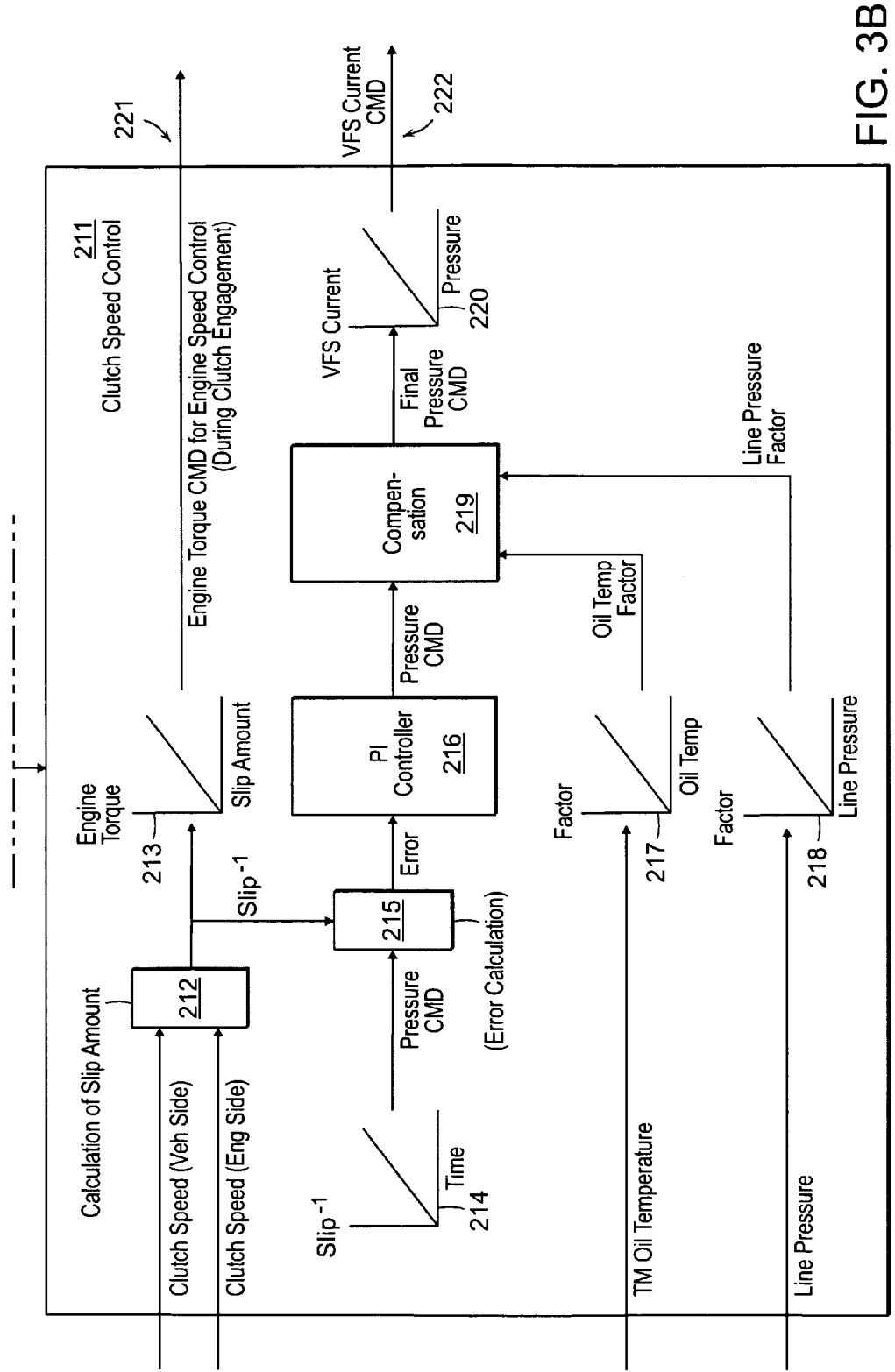
FIG. 3 is a diagram showing the clutch engagement control system in accordance with the preferred embodiment of the present invention.
Figure 3C:
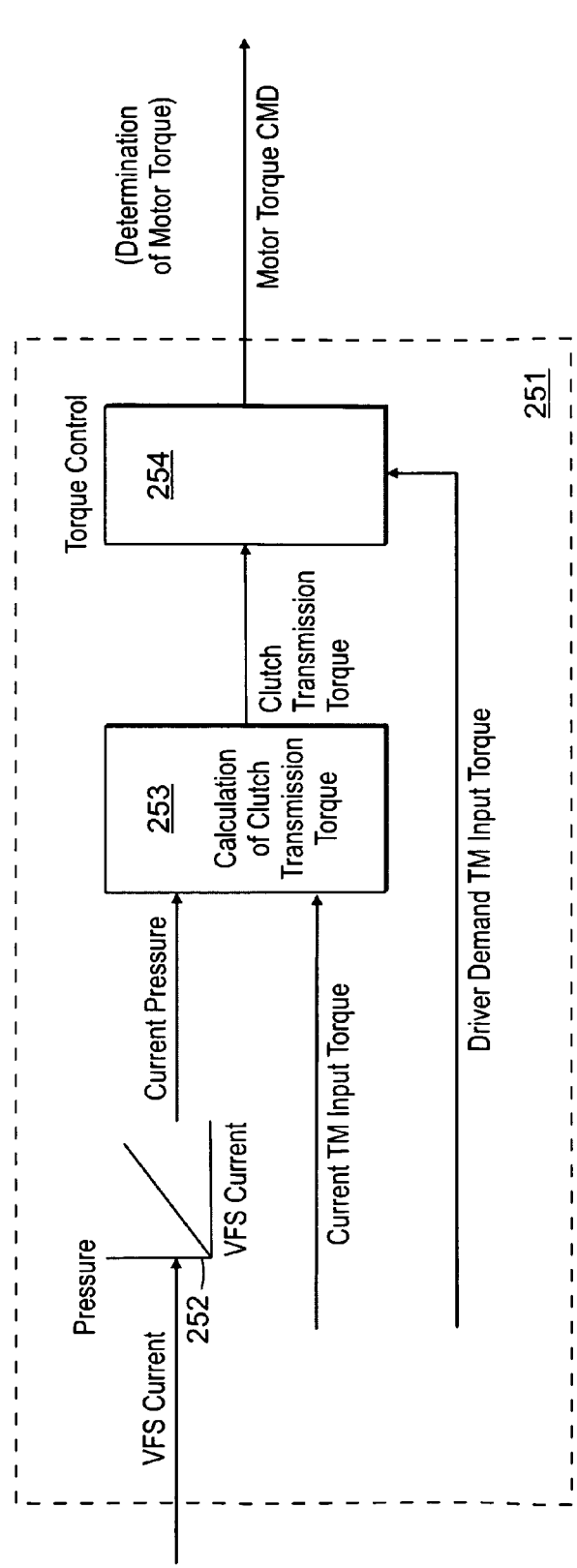

As shown in FIG. 3, the control system 200 includes a clutch engagement mode determination unit 201, a first control unit 211 for controlling a speed difference between both sections of the clutch, and a second control unit 251 for controlling a torque transmitted to the vehicle during clutch engagement.

The above respective components will be described in detail below.

First, the clutch engagement mode determination unit 201 will be described with reference to FIGS. 3 to 7.

Figure 4B:
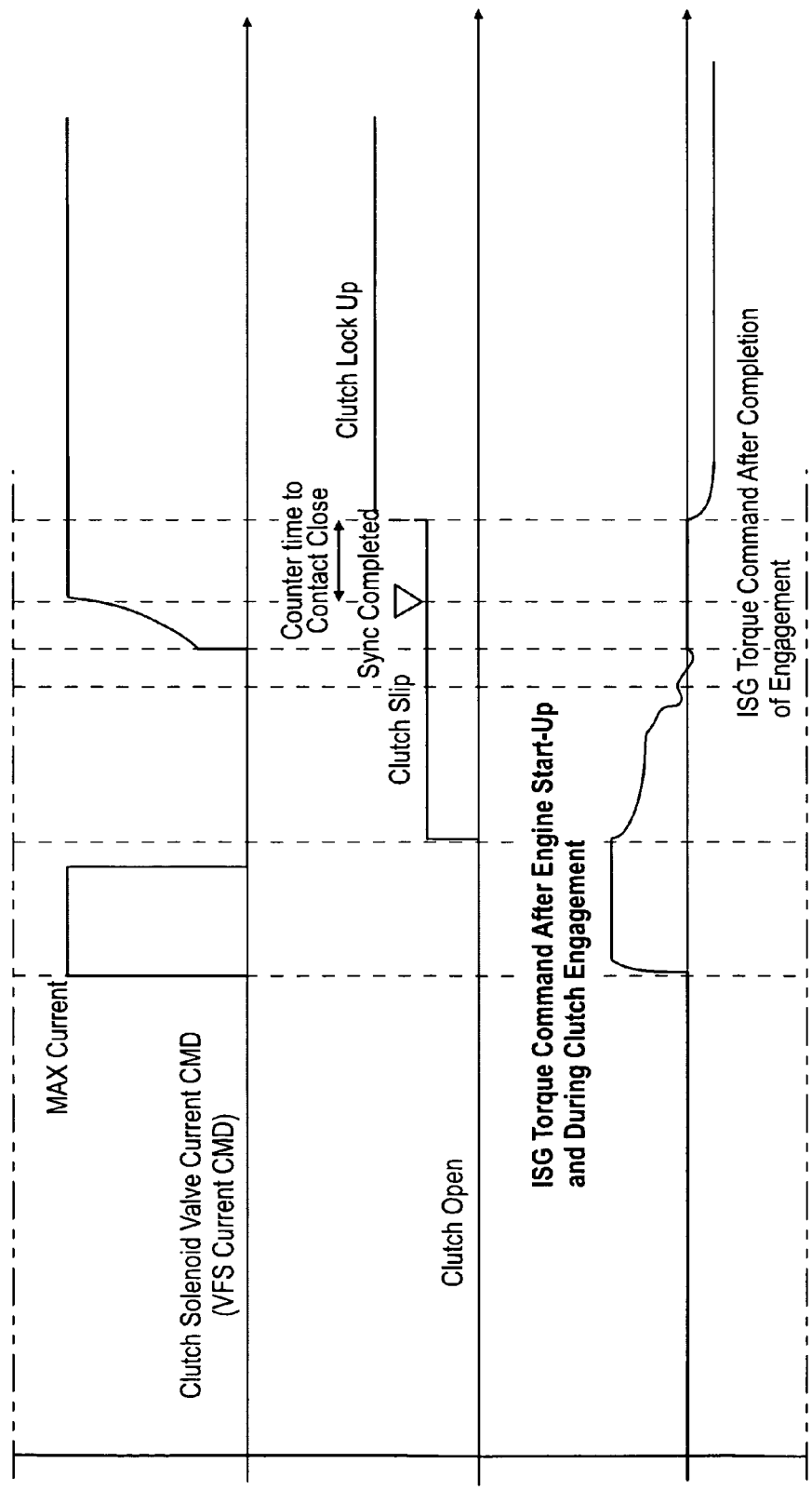
FIG. 4 is a diagram showing a change in respective commands in a first clutch engagement mode.
Figure 4C:
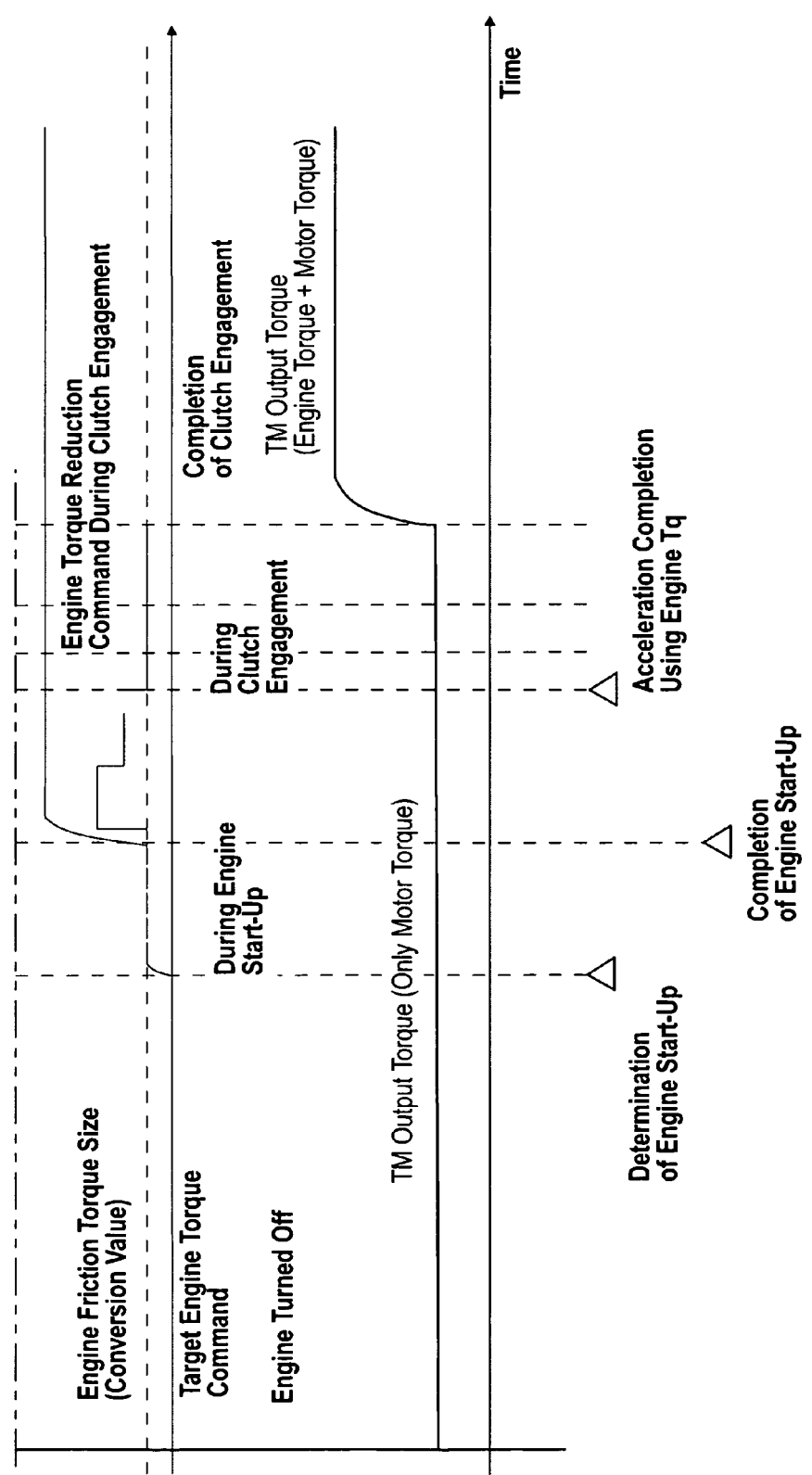
Figure 5B:
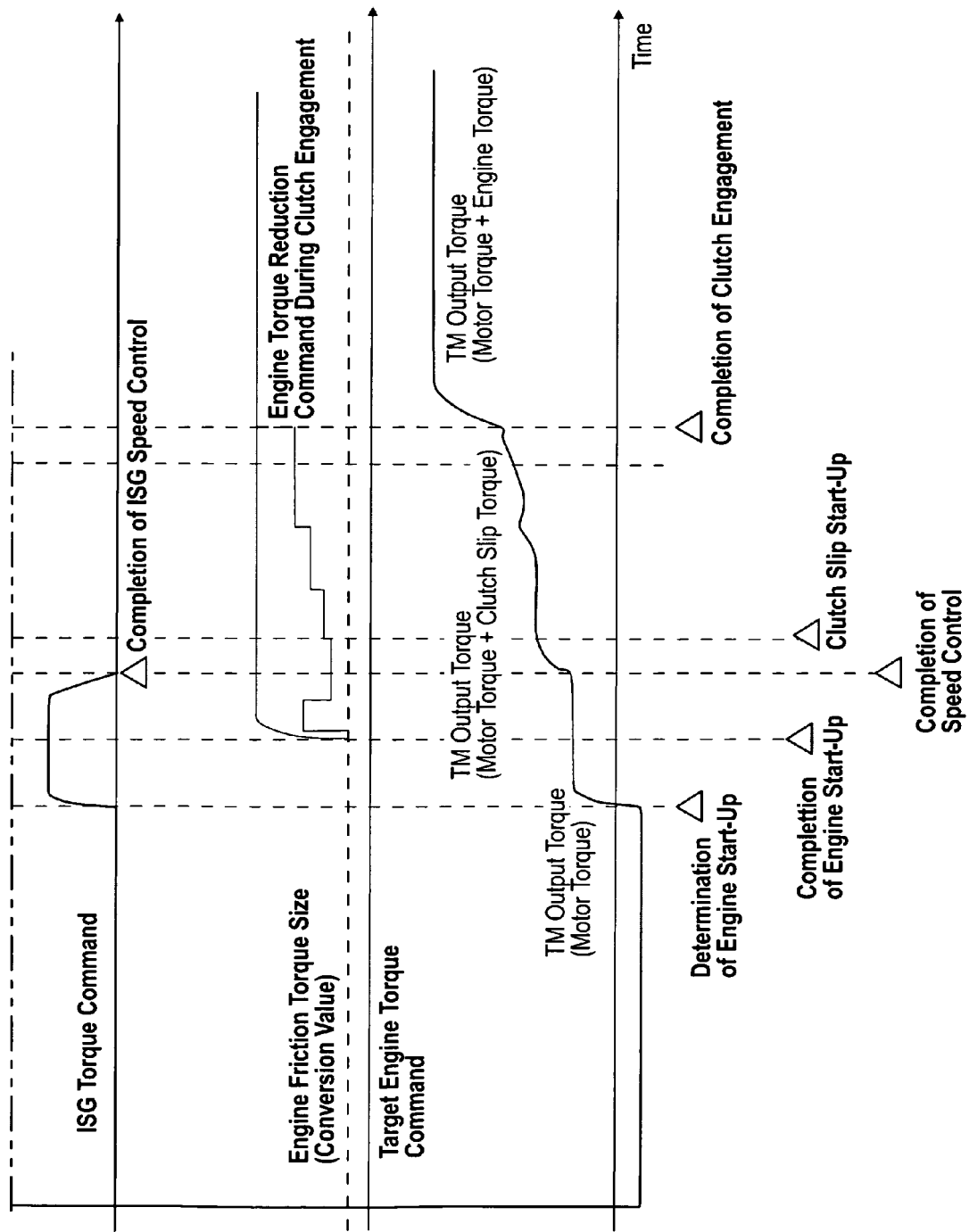
FIG. 5 is a diagram showing a change in respective commands in a second clutch engagement mode.

As shown in FIG. 3, the clutch engagement mode determination unit 201 receives vehicle state information 202, a user's clutch engagement interrupt request 203, and a user's clutch slip request 204 as input values to determine an appropriate clutch engagement mode (method) 206 and delivers a transmission interrupt request 205. Clutch engagement modes used in the present invention include: a first clutch engagement mode (on/off engagement mode), in which in which speed of engine side clutch section and that of transmission side clutch section are synchronized, in a state where the sections of the clutch are separated from each other, and then the oil pressure is increased as shown in FIG. 4; a second clutch engagement mode (slip engagement mode), in which the two speeds are synchronized, in a state where the sections of the clutch are slipping with each other, and then the oil pressure is increased as shown in FIG. 5; and a third clutch engagement mode (engine passive run engagement mode), in which the sections of the clutch are engaged with each other, in a state where the speed of the motor side clutch section is higher than that of the engine side clutch section, to apply a braking force to the vehicle.

Next, the clutch engagement in accordance with the present invention will be described in detail.

(A) The engine is turned on and a clutch engagement is determined.

(B) An engine start-up profile is commanded and an engine RPM operates according to the above command. When it reaches an ignition RPM, vehicle ignition is performed. An engine RPM command after the ignition is shown as a black line.

(C). During the above engine start-up, a clutch oil pressure control unit performs an initial filling process, in which a working fluid is appropriately filled in an empty space of the clutch. The initial filling process is performed to prevent the working fluid from not being filled in the empty space of the clutch after the lapse of a predetermined time in a state where the clutch is opened, and to make the clutch start to slip by applying a little bit more pressure.

(D) After the ignition, if the actual engine RPM is increased along the engine RPM command and thus falls within a predetermined range of a motor RPM that is a target engagement RPM, the oil pressure is applied to the clutch after the initial filling process to cause friction and engagement.

(E) During the friction of both sections of the clutch, if the speed difference between the sections falls below a predetermined range, a maximum pressure is applied to achieve a complete engagement with each other, and then the clutch engagement control is terminated.

The above processes (A) to (E) are applied to the first to third clutch engagement modes in the same manner only with the difference in terms of i) the engine start-up profile, ii) the ignition RPM, iii) the engine RPM command after ignition, and iv) the difference in the friction start RPM.

In particular, in the first clutch engagement mode, an engine start-up RPM is increased up to about 800 rpm at an appropriate slope, and the ignition RPM is set to about 800 rpm. Moreover, the engine RPM command after ignition is increased at an appropriate slope, and the difference in the friction start RPM is set to close to 0.

In the second clutch engagement mode, the engine start-up RPM is increased up to about 800 rpm at an appropriate slope the same as the first clutch engagement mode, but the ignition RPM is set to as low as about 500 rpm in order to quickly obtain an engine torque. Moreover, the engine RPM command after ignition is increased at an appropriate slope higher than the previous one, and the difference in the friction start RPM is set to a value in which the engine RPM is greater than the motor RPM, for example, 1000 rpm. With the above-described setting, an acceleration force is transmitted to the vehicle during the slip, and thus the acceleration performance of the vehicle is improved.

The third clutch engagement mode is directed to a mode for delivering a braking force to the vehicle, in which, in the engine start-up RPM profile, the engine is accelerated at a rate lower than an ordinary state or is not accelerated in a case where the clutch can be directly engaged without accelerating the engine. However, since the engine generates considerable vibration in the range of 0 to 100 rpm, it is preferable to increase the engine start-up RPM profile in the above range and start the engagement thereafter.

Subsequently, when the actual engine RPM is increased up to the command region, the ignition RPM is set to an RPM value, e.g., 1000 rpm, which the engine cannot reach, so as not to cause an ignition. At the same time, when the friction start RPM value is set to a predetermined high value, e.g., 1000 rpm, both sections of the clutch start the friction, and the ignition is not made. Accordingly, the engine torque having only a friction resistance is transmitted to the vehicle through the clutch friction, and thus an engine braking effect is obtained.

Moreover, in the first to third clutch engagement modes, various changes in the engagement modes can be made by changing certain command value(s).

Figure 7:
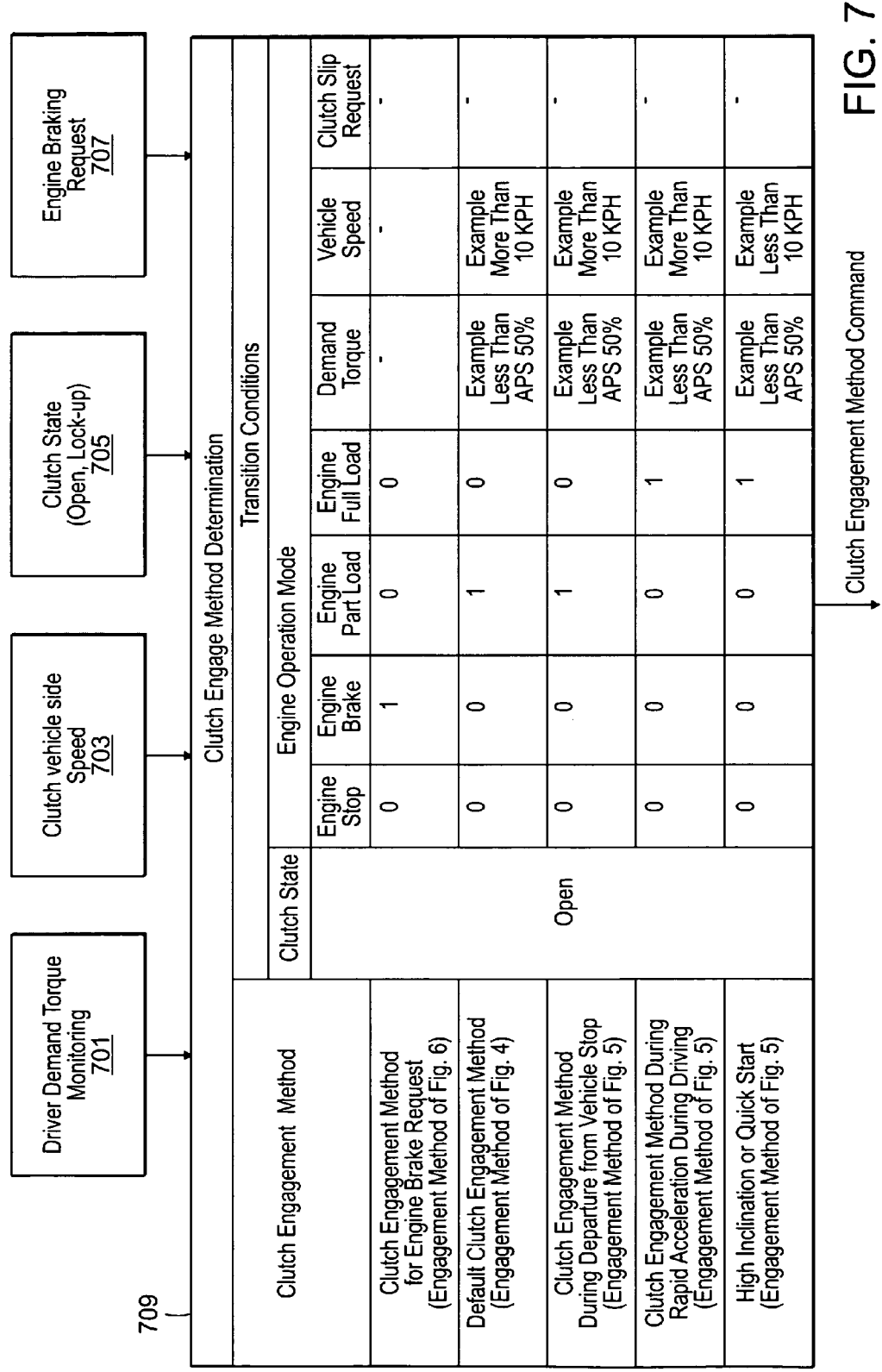
FIG. 7 is a diagram showing a clutch engagement mode determination in accordance with another preferred embodiment of the present invention.

FIG. 7 is a diagram showing a clutch engagement mode determination method in accordance with another preferred embodiment of the present invention.

The clutch engagement mode determination unit 210 receives a driver demand torque 701, a transmission of vehicle side clutch speed 703, clutch state (open or lock-up) 705, an engine braking request 707, a clutch engagement interrupt request, a clutch slip request, and the like, and determines a clutch engagement mode.

In this embodiment, the third clutch engagement mode is applied when an engine brake is request, the first clutch engagement mode is applied in an ordinary state, and the second clutch engagement mode is applied in the cases of a departure from a vehicle stop, a rapid acceleration during driving, a high inclination, and a quick start.

Especially, the above clutch engagement mode determination is performed when there are no clutch engagement interrupt request and clutch slip request by the driver.

In accordance with the above-described clutch engagement mode determination, change of parameters such as a gain value 216 of a PI controller in the first control unit, a slip amount table 214 according to time, an engine torque table 213 according to the slip amount, and an engagement time point occurs. Accordingly, the first control unit performs the control operation by applying the above-described changes and, as a result, an engine torque command 221 and a VFS current command 222 are calculated during the clutch engagement for the engine speed control.

Figure 8:
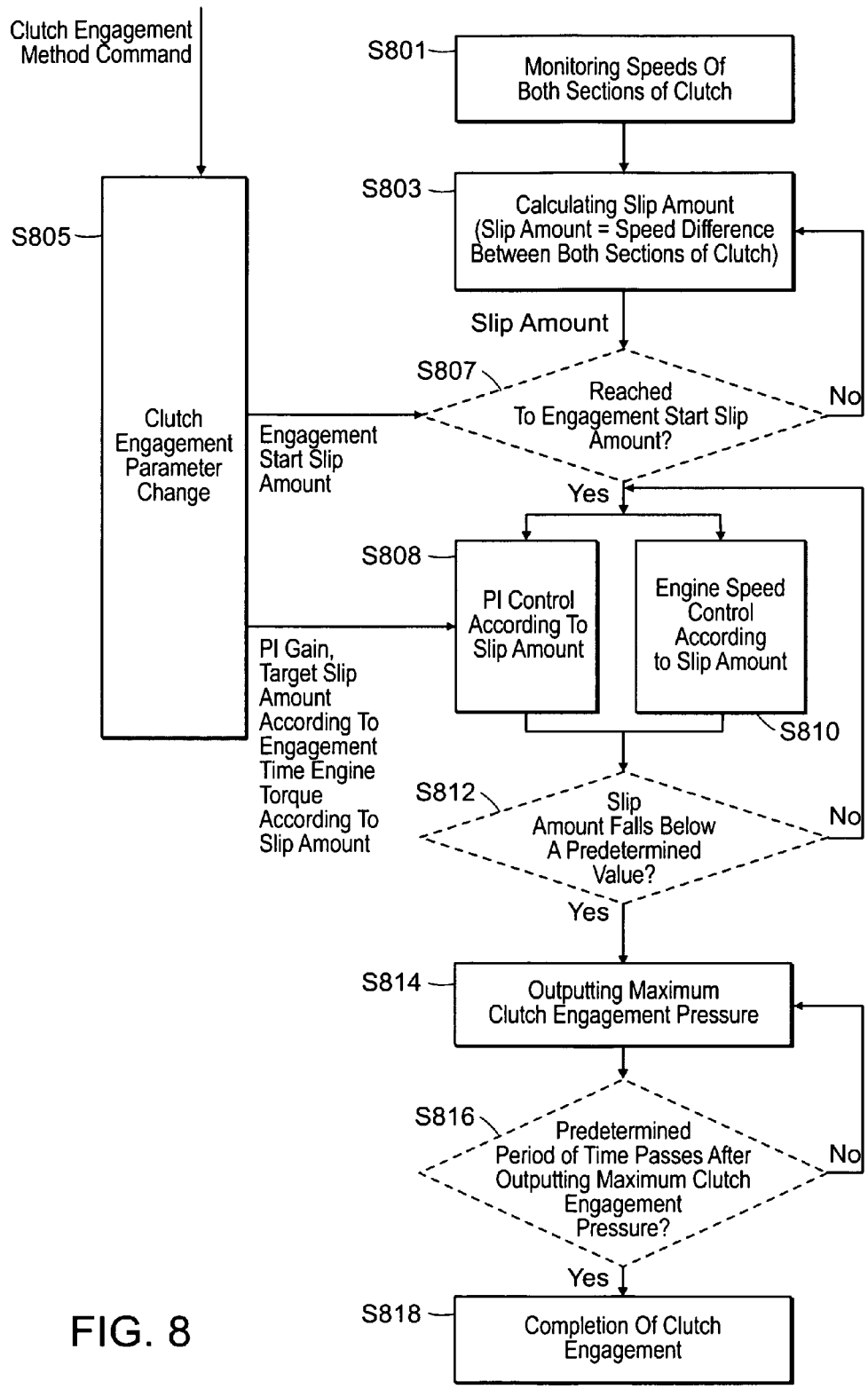
FIG. 8 is a flowchart illustrating a control flow of a first control unit in accordance with the present invention.

FIG. 8 shows a control flow of the first control unit in accordance with the present invention. The control unit monitors the speeds of both sections of the clutch (S801) to calculate the slip amount 212, which is a speed difference between the sections of the clutch, (S803).

Meanwhile, a parameter changed by the clutch engagement mode is applied (S805) to determine whether it reaches an engagement start slip amount (S807). If so, the control unit performs a PI control (S808) according to the slip amount and an engine speed control (S810) according to the slip amount.

During the above-described control, if the slip amount falls below a predetermined value (S812), the control unit outputs a maximum clutch engagement pressure (S814), maintains the clutch engagement pressure for a predetermined period of time, and finishes the clutch engagement process (S818).

During the PI control, after generating a pressure command, the control unit measures a TM oil temperature 217 and a line pressure (218) to calculate an appropriate factor. The control unit, with this factor, performs a compensation process (219), thereby calculating a VFS current command 222.

Meanwhile, at the same with the control operation by the first control unit, the second control unit for compensating for a torque transmitted to the transmission of vehicle is performed.

Figure 9:
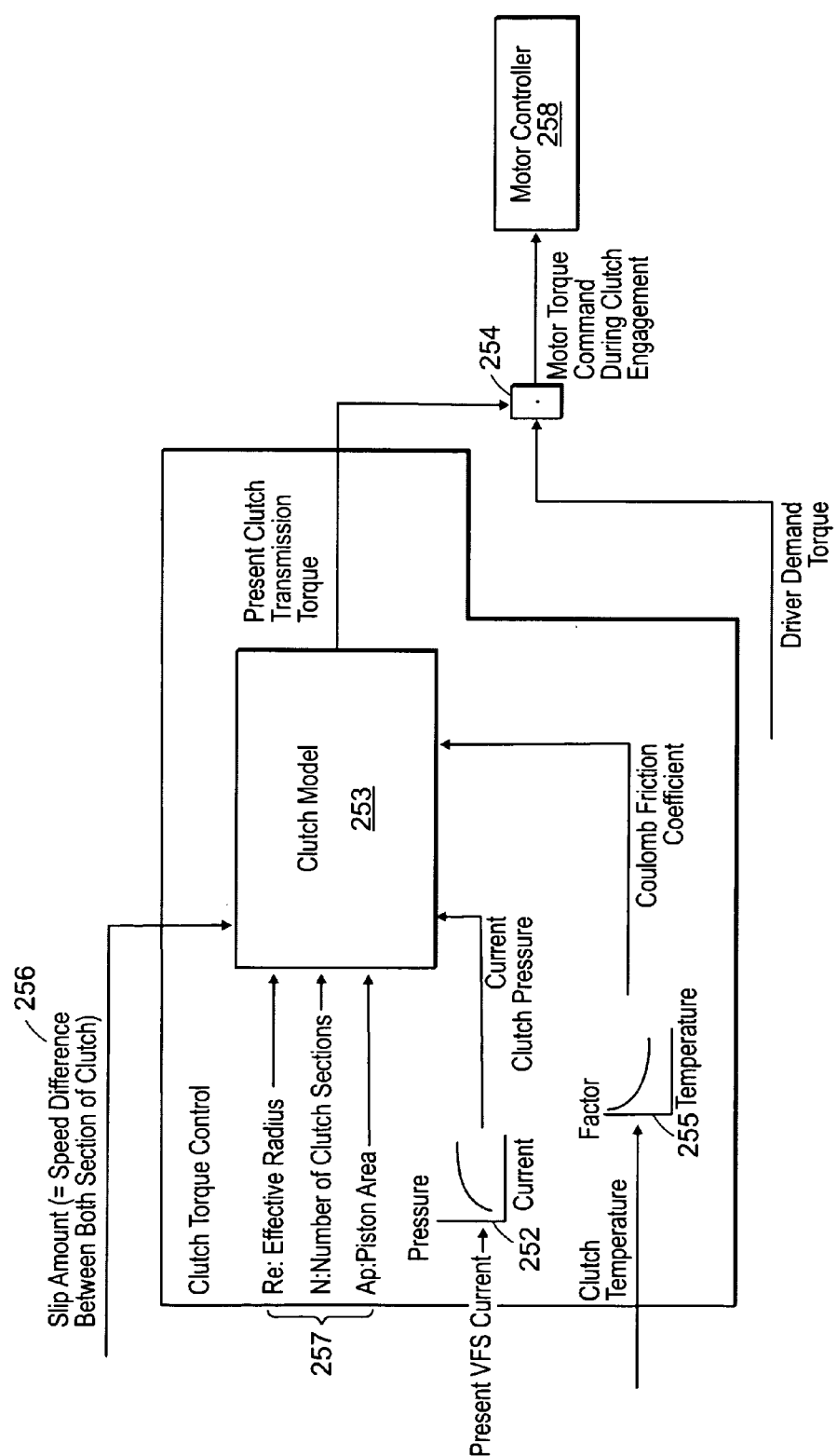
FIG. 9 is a diagram showing a configuration of a second control unit in accordance with the present invention.
Figure 10:
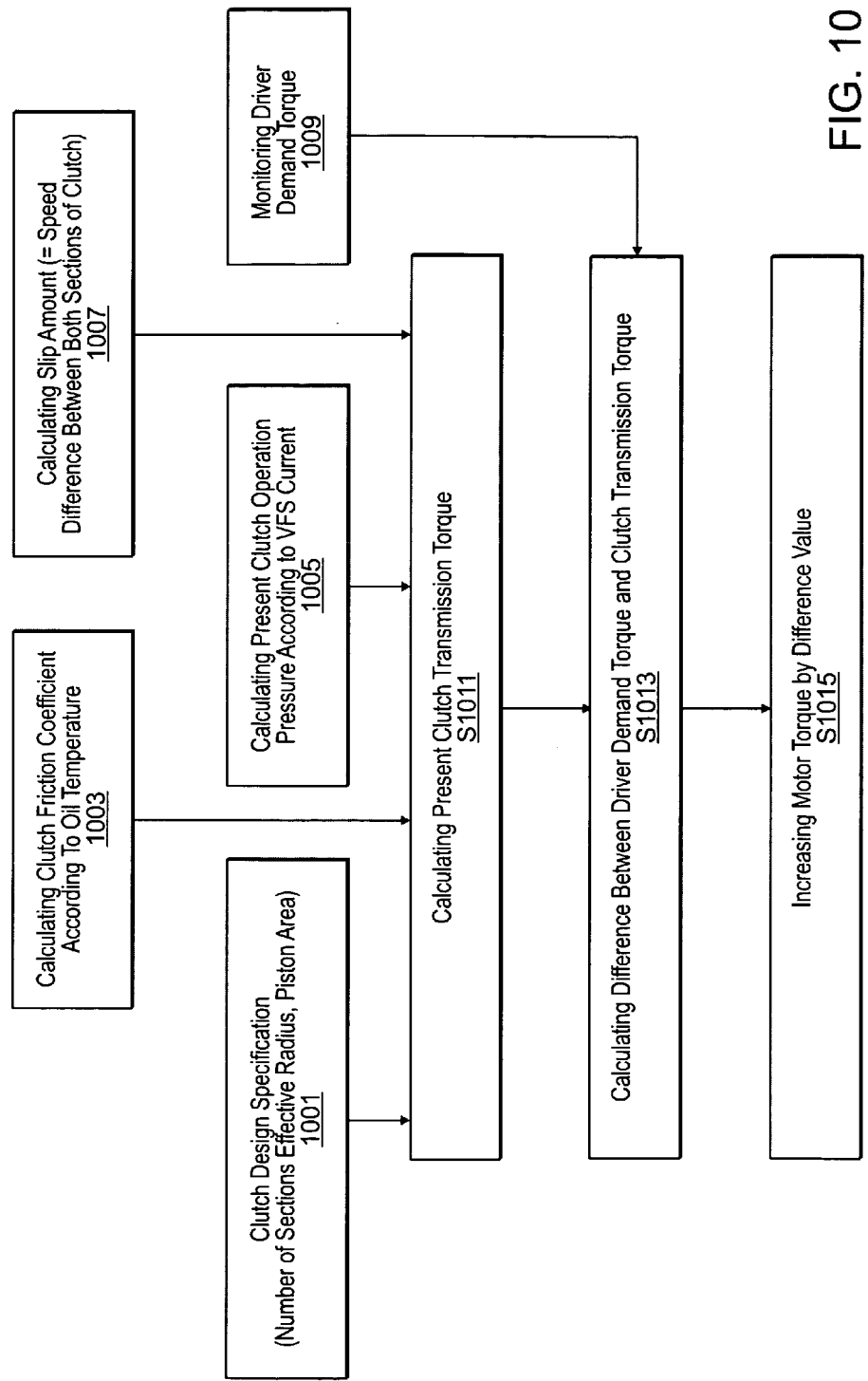
FIG. 10 is a flowchart illustrating a control flow of a second control unit in accordance with the present invention.

The configuration of the second control unit is shown in FIG. 9, and its control flow is shown in FIG. 10.

A clutch model 253 receiving a slip amount 256, a clutch design specification 257 (effective radius, number of sections, piston area, etc.), a current-time clutch pressure 252, and a clutch friction coefficient according to oil temperature calculates a current-time clutch transmission torque. In this process, a conventional clutch transmission torque theory, which is known to those having ordinary skill in the art, is used.

Then, the second control unit calculates a difference between the clutch transmission torque calculated as above and a driver demand torque 1009 (S1013) and increases a motor torque by the difference value (S1015).

As above, the clutch engagement control system in accordance with the present invention broadly includes a determination unit to determine a clutch engagement mode based on variables including vehicle state, and first and second control units to control a torque change caused when the clutch engagement is performed by the above engagement mode.

As described above, the system and method for controlling clutch engagement in the hybrid vehicle of the present invention provides various effects including the following.

First, an appropriate clutch engagement mode is selected based on many variables including vehicle state, a driver demand torque, a clutch engagement interrupt request, a clutch slip request, and the like, thus improving the acceleration performance, fuel efficiency, driving performance, and durability of the vehicle.

Second, a parameter change according to the clutch engagement mode is reflected in performing the control operation, thus easily designing and providing various clutch engagement modes.

Lastly, a torque transmitted to the vehicle during the clutch engagement process is controlled, and thus reducing engagement impact.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for controlling clutch engagement in a hybrid vehicle including a clutch disposed between an engine and a motor, the system comprising:
    a determination unit for selecting an engagement mode from a plurality of clutch engagement modes based on a vehicle state, a clutch engagement interrupt request, and a clutch slip request:
    a first control unit for calculating an engine torque command and a VFS current command for adjusting a speed difference between both sections of the clutch; and
    a second control unit for calculating a motor torque command for adjusting a torque transmitted to the vehicle during clutch engagement,
    wherein the second control unit comprises:
    a clutch model unit for calculating a current-time clutch transmission torque by receiving a slip amount, a clutch design specification, a current-time clutch pressure, and a clutch friction coefficient according to an oil temperature; and
    a motor torque command calculation unit for calculating a motor torque command by a difference obtained by comparing the current-time clutch transmission torque calculated by the clutch model unit and a driver demand torque.

2. The system of claim 1, wherein the plurality of clutch engagement modes are classified according to an engine start-up profile, an ignition RPM, an engine RPM command after ignition, and a difference in a friction start RPM.

3. The system of claim 1, wherein the plurality of clutch engagement modes comprise:
    a first clutch engagement mode, in which speed of engine side clutch section and that of transmission side clutch section are synchronized, in a state where the sections of the clutch are separated from each other, and then an oil pressure is increased;
    a second clutch engagement mode, in which the two speeds are synchronized, in a state where the sections of the clutch are slipping with each other, and then the oil pressure is increased; and
    a third clutch engagement mode, in which the sections of the clutch are engaged with each other, in a state where the speed of the motor side clutch section is higher than that of the engine side clutch section, to apply a braking force to the vehicle.

4. The system of claim 1, wherein the first control unit comprises: a slip amount calculation unit; and an engine torque command calculation unit for calculating an engine torque command based on a slip amount calculated by the slip amount calculation unit, wherein an engine torque value with respect to the slip amount is determined by the clutch engagement mode.

5. A method for controlling clutch engagement in a hybrid vehicle including a clutch disposed between an engine and a motor, the method comprising selecting an engagement mode from a plurality of clutch engagement modes based on vehicle state, a clutch engagement interrupt request, and a clutch slip request.

6. The method of claim 5, wherein the plurality of clutch engagement modes are classified according to an engine start-up profile, an ignition RPM, an engine RPM command after ignition, and a difference in a friction start RPM.

7. The method of claim 5, further comprising:
    calculating an engine torque command for adjusting a speed difference between both sections of the clutch by reflecting a parameter change according to the clutch engagement mode; and
    calculating a motor torque command for adjusting a torque transmitted to the vehicle during clutch engagement.

* * * * *